UNITED STATES PATENT OFFICE.

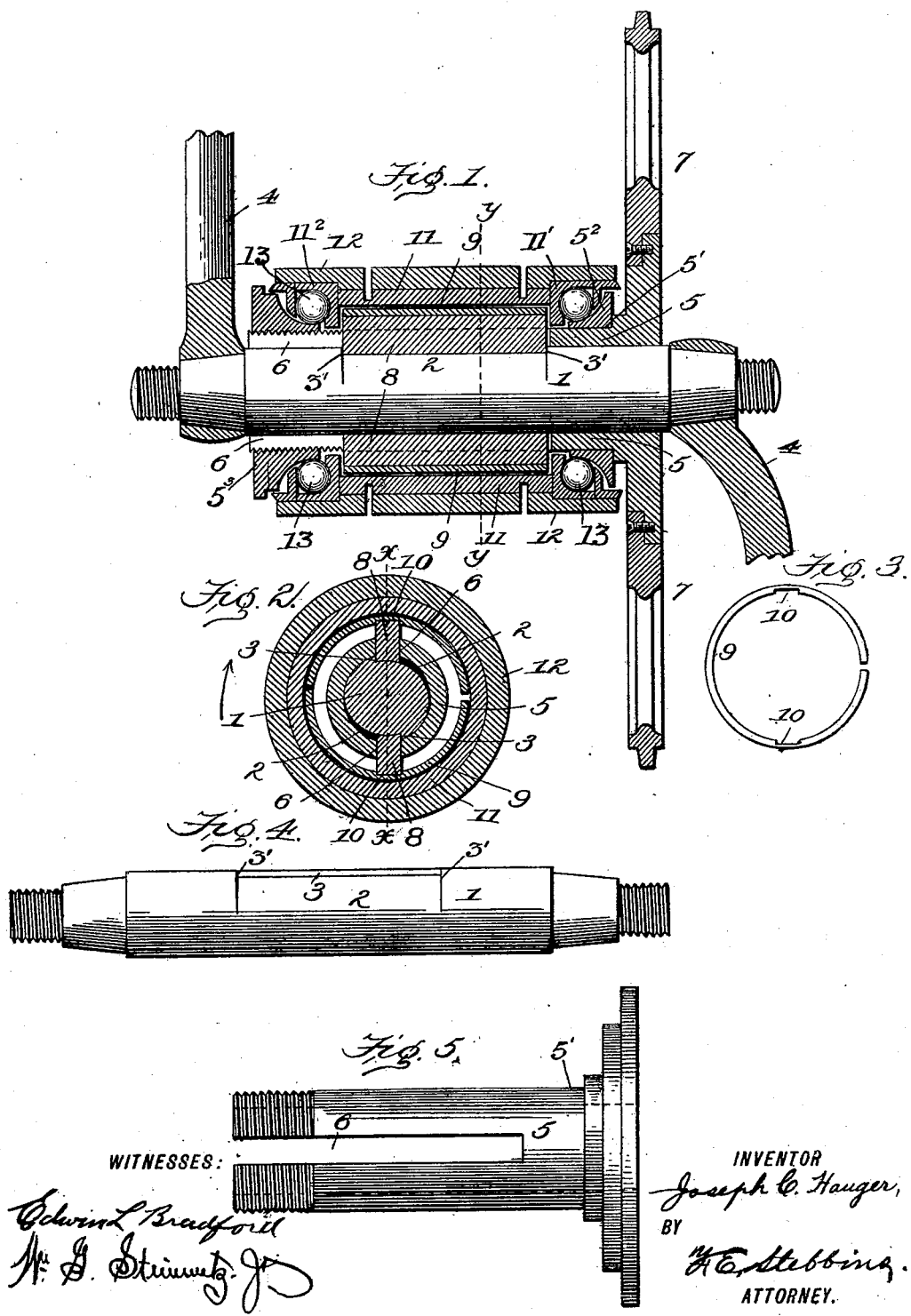

JOSEPH C. HAUGER, OF SHEPHERDSTOWN, WEST VIRGINIA, ASSIGNOR OF ONE-HALF TO JOHN F. LEGGE, OF WASHINGTON, DISTRICT OF COLUMBIA.

BICYCLE-BRAKE.

SPECIFICATION forming part of Letters Patent No. 646,431, dated April 3, 1900.

Application filed August 11, 1896. Serial No. 602,421. (No model.)

*To all whom it may concern:*

Be it known that I, JOSEPH C. HAUGER, a citizen of the United States, residing at Shepherdstown, in the county of Jefferson and State of West Virginia, have invented certain new and useful Improvements in Bicycle-Brakes; and I do declare the following to be a full, clear, and exact description of the invention, such as will enable others skilled in the art to which it appertains to make and use the same, reference being had to the accompanying drawings, and to the figures of reference marked thereon, which form a part of this specification.

The object of my invention is the production of a bicycle-brake which shall be comparatively cheap in first cost, very efficient in action, adapted to be easily and quickly applied and released, light in weight, durable, easily and cheaply repaired should an element thereof become excessively worn, and which is so located relative to other parts of the bicycle that it cannot under any circumstances engage the clothing of the rider or present any external obstruction to the free action of the limbs in propulsion.

With this general object in view my invention consists in certain novelties of constructions and combinations of parts hereinafter specifically described, and pointed out in the claims.

The accompanying drawings illustrate one pictured example of the physical embodiment of my invention and which is constructed by what I regard as the best of the several modes I have so far devised for the application of the principle.

Figure 1 is a view, partly in section, taken on line $x\ x$ of Fig. 2, showing a bearing with my improvements applied. Fig. 2 is a sectional view taken on line $y\ y$ of Fig. 1. Fig. 3 is a view of the brake-shoe or ring. Fig. 4 is a view in elevation of the axle shown in Fig. 1, but turned end for end. Fig. 5 is a view of the sprocket-wheel sleeve slotted as shown and threaded at the free end.

The axle 1 for a part of its length is formed with the cam-shaped faces 2 2, the offsets 3 3, and the shoulders 3' 3'. To the ends of the axle are attached in any convenient way the pedals 4 4. A sleeve 5, having longitudinal open slots 6 6, fits over the axle and has secured to its flange a sprocket-wheel 7. This sleeve 5 has a seat 5', to which is immovably secured a conical washer $5^2$ and is also threaded at the free end to receive the conical washer $5^3$. Two brake-bars 8 8 loosely fit within the slots 6 6 of this sleeve, their inner edges bearing against the cam-shaped faces of the axle and their outer edges resting in seats 10 10, formed within the brake-shoe or expansible split ring 9. The shoulders 3' 3' on the axle prevent longitudinal movement of the bars 8 8. A removable cylindrical ring 11 encircles the axle, brake-bars, and shoe and is rigidly held in a stationary position within the shell 12 of the bearing. This ring is further secured against endwise movement by the bearings 11' and $11^2$, which, in connection with the bearing $5^2$ and washer $5^3$ and the balls 13, constitute the ball-bearings of the cycle.

I have not specified the material from which the shoe 9 and cylindrical ring 11 are to be made, as I propose to use any well-known frictional metal or composition for each or both, as may be found desirable or congenial.

It will be obvious from a mere inspection of my improvements that by the peculiar construction and arrangement many important practical results are secured. By the particular combination of the several elements a new brake-shoe or split ring can be easily substituted for one worn out. By having the sleeve 5 threaded at the end and using the conical washer $5^3$ the adjustment of the ball-bearings is easily effected, and by seating the brake-shoes in the slots 6 6 ample bearing area is obtained. By providing the shoulders 3' 3' the bars are held against endwise movement relative to the axle, and by using long bars and preferably two of them, as shown, an even pressure can be exerted against the wide ring 9, which latter is necessary to secure sufficient frictional surface to constitute an efficient brake.

The *modus operandi* is as follows: Upon the application of power to the pedals and the revolution of the axle in the direction indicated by the arrow in Fig. 2 motion will be imparted to the sprocket-wheel and through the medium of the sprocket-chain to the rear wheel of the bicycle. This is effected by reason of the offsets 2 2 on the axle bearing against the bars 8 8, which in turn engage the sleeve 5. The shoe or split ring 9 is also revolved, inasmuch as it is seated upon the bars 8 8 and, moreover, it revolves freely with the axle, the elasticity of the metal of which the shoe is composed holding it against the bars and away from the cylindrical ring 11.

Should the pedals be retarded or reversed while the bicycle is in motion, the momentum of the cycle and rider will cause the rear wheel to continue its revolution and at the same time through the medium of the sprocket-chain impart motion to the sprocket-wheel 7, sleeve 5, brake-bars 8 8, and brake-shoe or ring 9. As these latter elements revolve the brake-bars 8 8 leave their normal position adjacent the offsets on the axle, move along the cam-faces, and are forced outwardly through the slots 6 6, expanding the brake-shoe or ring 9 and causing it to come in contact with the inner surface of the stationary cylindrical ring 11. The work done by the shoe moving in contact with the stationary cylindrical ring overcomes the momentum of the cycle and rider and quickly brings both to a state of rest.

While I have shown on the drawings two brake-bars in contact with the split ring, I may in some cases use one bar only and a different form of shoe. However, I prefer the use of the split ring and two brake-bars, located substantially opposite each other, inasmuch as such an arrangement increases the area of frictional contact and equalizes the outward pressure against the shell, and in such case the axle will be provided with a single cam-face and offset. Other colorable and minor changes may be introduced at the discretion of the manufacturer without constituting a substantial departure.

What I claim as new, and desire to secure by Letters Patent, is—

1. The combination in a bicycle, of a shell 12; a cylindrical ring 11; a sleeve 5 extending through the shell, movable with the sprocket-wheel, and provided with a conical bearing $5^2$ at one end, a conical bearing at the opposite end, and a slot 6; bearings $11'$, $11^2$; balls 13; a brake-shoe; a brake-bar 8 located in the slot 6 and bearing against the shoe; and an axle having a cam-shaped face 2, and an offset 3 adapted to engage the bar 8; in substance as set forth.

2. The combination in a bicycle, of a shell 12; a ring 11; a sleeve 5 extending through the shell, movable with the sprocket-wheel, and provided with a conical bearing $5^2$ at one end, a conical bearing at the opposite end, and slots 6, 6; bearings $11'$, $11^2$; balls 13; a brake-shoe consisting of a split ring 9 concentric with the shell 12; two brake-bars 8, 8, located in slots 6 6 and having their outer edges bearing against the inner surface of the split ring 9 and adapted to expand the same radially; and an axle having two cam-shaped faces 2, 2, and offsets 3, 3, adapted to engage the inner edges of the bars 8, 8; the said offsets and the parts coöperating therewith being substantially opposite; in substance as set forth.

3. The combination in a bicycle, of a shell 12; a cylindrical ring 11; a slotted sleeve 5 extending through the shell 12; ball-bearings between the shell and sleeve; a brake-shoe located between the ring 11 and sleeve 5; a brake-bar 8 located in the slot of the sleeve; an axle having a cam-face, an offset 3, and shoulders $3'$, $3'$; and pedals on the ends of the axle; in substance as set forth.

4. The combination in a bicycle of a shell 12; a slotted sleeve 5, extending entirely through the shell, having a sprocket-wheel at one end, and means for holding the sleeve within the shell at the other end; ball-bearings between the shell and sleeve; a brake-shoe between the shell and sleeve; an axle within the sleeve provided with pedals; and means located within the slot of the sleeve adapted to engage the shoe and force it into frictional contact with the shell, and also to be engaged by the axle and impart motion to the sleeve; in substance as set forth.

5. In a driving-gear, the combination with a driving-shaft; a shell 12 having a brake-surface; and a sleeve 5 extending entirely through the shell and detachably held in position by suitable means; of a brake-shoe movable radially relative to the driving-shaft and the sleeve 5, and adapted to coöperate with the brake-surface of the shell 12; an incline between the shoe and the driving-shaft; and means for forward propulsion; whereby when the speed of sleeve 12 exceeds that of the driving-shaft the incline coöperating with the shoe will press the latter on the brake-surface.

In testimony whereof I affix my signature in presence of two witnesses.

JOSEPH C. HAUGER.

Witnesses:
LILLIE FLEMING,
J. S. FLEMING.